United States Patent
Givens, Jr.

(10) Patent No.: US 10,322,843 B2
(45) Date of Patent: Jun. 18, 2019

(54) COLLAPSIBLE INSULATING CONTAINER LINER

(71) Applicant: Drew Foam Companies Inc., Monticello, AR (US)

(72) Inventor: William C. Givens, Jr., Lake Village, AR (US)

(73) Assignee: Drew Foam Companies Inc., Monticello, AR (US)

( * ) Notice: Subject to any disclaimer, the term of this patent is extended or adjusted under 35 U.S.C. 154(b) by 0 days.

(21) Appl. No.: 15/813,656

(22) Filed: Nov. 15, 2017

(65) Prior Publication Data
US 2018/0155076 A1   Jun. 7, 2018

Related U.S. Application Data

(60) Provisional application No. 62/428,794, filed on Dec. 1, 2016.

(51) Int. Cl.
| B65D 81/38 | (2006.01) |
| B65D 5/498 | (2006.01) |
| B32B 15/12 | (2006.01) |
| B29C 53/06 | (2006.01) |

(52) U.S. Cl.
CPC .......... *B65D 5/48048* (2013.01); *B32B 15/12* (2013.01); *B65D 81/3816* (2013.01); *B65D 81/3823* (2013.01); *B65D 81/3897* (2013.01); *B29C 53/063* (2013.01); *B32B 2307/304* (2013.01)

(58) Field of Classification Search
CPC ............ B65D 5/48048; B65D 81/3816; B65D 81/3823; B65D 81/3897; B32B 15/12; B32B 2307/304; B29C 53/063
See application file for complete search history.

(56) References Cited

U.S. PATENT DOCUMENTS

| 1,928,660 A | 10/1933 | Boeye |
| 2,231,981 A | 2/1941 | Zalkind |
| 3,880,341 A | 4/1975 | Bamburg et al. |
| 3,980,005 A | 9/1976 | Buonaiuto |
| 3,997,098 A | 12/1976 | Van Petten |
| 4,048,926 A | 9/1977 | Brush, Jr. et al. |
| 4,141,481 A | 2/1979 | Van Petten |
| 4,748,066 A | 5/1988 | Kelly et al. |
| 4,826,010 A | 5/1989 | Jahr, Jr. et al. |
| 4,826,040 A | 5/1989 | Jahr, Jr. et al. |
| 4,863,702 A | 9/1989 | Galloway et al. |
| 4,870,735 A | 10/1989 | Jahr, Jr. et al. |

(Continued)

FOREIGN PATENT DOCUMENTS

| FR | 2 821 786 A1 | 9/2002 |
| FR | 2 839 498 A1 | 11/2003 |

(Continued)

OTHER PUBLICATIONS

Thermal Box Panels https://www.uline.com/BL_1408/Thermal-Box-Panels.

*Primary Examiner* — Corey N Skurdal
(74) *Attorney, Agent, or Firm* — Blank Rome LLP

(57) ABSTRACT

Collapsible insulating container liners and methods of manufacturing the same are disclosed herein. The container liner is formed as one unitary, foldable body that includes, in one example, beveled edges that form top panel(s), bottom panel(s), and side panel(s) that facilitate folding of the body to form the resulting liner.

18 Claims, 9 Drawing Sheets

(56) References Cited

U.S. PATENT DOCUMENTS

| | | |
|---|---|---|
| 4,918,808 A | 4/1990 | Cartry et al. |
| 5,000,372 A | 3/1991 | Hollander et al. |
| 5,031,578 A | 7/1991 | Hammons et al. |
| 5,042,663 A | 8/1991 | Heinrich |
| 5,111,957 A | 5/1992 | Hollander et al. |
| 5,575,418 A | 11/1996 | Wu et al. |
| 5,590,625 A | 1/1997 | Bivens |
| 5,914,120 A | 6/1999 | Wellinghoff et al. |
| 5,924,302 A | 7/1999 | Derifield |
| 5,993,593 A | 11/1999 | Swartz et al. |
| 6,044,812 A | 4/2000 | Bivens |
| 6,046,243 A | 4/2000 | Wellinghoff et al. |
| 6,155,446 A | 12/2000 | Alexander et al. |
| 6,355,732 B1 | 3/2002 | Beer |
| 6,450,356 B1 | 9/2002 | Alexander et al. |
| 6,513,703 B2 | 2/2003 | Becker |
| 6,513,974 B2 | 2/2003 | Malone et al. |
| 6,610,382 B1 | 8/2003 | Kobe et al. |
| 6,727,404 B2 | 4/2004 | Ruman et al. |
| 6,817,379 B2 | 11/2004 | Perla |
| 6,869,539 B2 | 3/2005 | Sheets |
| 6,904,615 B2 | 6/2005 | Kobe et al. |
| 6,910,582 B2 | 6/2005 | Lantz |
| 6,995,353 B2 | 2/2006 | Beinhocker |
| 7,211,783 B2 | 5/2007 | Beinhocker |
| 7,332,728 B2 | 2/2008 | Beinhocker |
| 7,394,060 B2 | 7/2008 | Beinhocker |
| 7,482,924 B1 | 1/2009 | Beinhocker |
| 7,608,812 B2 | 10/2009 | Beinhocker |
| 7,621,404 B2 | 11/2009 | Murray |
| 7,766,180 B2 | 8/2010 | Mansouri et al. |
| 7,935,376 B2 | 5/2011 | Wilson et al. |
| 7,938,621 B1 | 5/2011 | Balsdon et al. |
| 7,966,569 B2 | 6/2011 | Pandey |
| 7,975,905 B2 | 7/2011 | Humphries et al. |
| 8,322,571 B2 | 12/2012 | Hovinen et al. |
| 8,763,811 B2 | 7/2014 | Lantz |
| 8,919,082 B1 | 12/2014 | Cataldo |
| 8,987,070 B2 | 3/2015 | Cheng et al. |
| 9,060,508 B2 | 6/2015 | Anti et al. |
| 9,073,028 B2 | 7/2015 | Hovinen et al. |
| 9,284,088 B2 | 3/2016 | Humphries et al. |
| 2004/0154951 A1 | 8/2004 | Hartung |
| 2005/0189404 A1 | 9/2005 | Xiaohai et al. |
| 2010/0006630 A1 | 1/2010 | Humphries et al. |
| 2012/0193365 A1 | 8/2012 | Humphries et al. |
| 2013/0305535 A1 | 11/2013 | Cur et al. |
| 2015/0136795 A1 | 5/2015 | Smith |
| 2015/0158656 A1 | 6/2015 | McKinnon |
| 2017/0327298 A1 | 11/2017 | Morasse et al. |

FOREIGN PATENT DOCUMENTS

| | | |
|---|---|---|
| GB | 1 583 324 A | 1/1981 |
| WO | WO 2007/030110 A1 | 3/2007 |
| WO | WO 2016/124892 A2 | 8/2016 |

COLLAPSIBLE INSULATING CONTAINER LINER

RELATED APPLICATION

This application claims the priority benefit of Provisional Patent Application No. 62/428,794, filed on Dec. 1, 2016, the disclosure of which is incorporated herein by reference.

BACKGROUND

Perishable goods should be kept below certain temperatures during shipping to prevent them from spoiling before they reach their destination. Often, perishable goods are shipped in containers that contain gel or ice packs to help maintain the necessary temperature. The containers themselves may also contain bags or liners to help keep the items cool during transport. Gel and ice packs, as well as specially-formed liners for shipping containers, require additional materials and manufacturing steps and can add to the overall cost of shipping. For example, known liners may require the assembly of multiple pieces to be placed in the shipping container, such as the chill box disclosed in U.S. Pat. No. 5,111,957 or the shipping container disclosed in U.S. Pat. No. 8,763,811. Other known liners that are formed as one, unitary body have complex designs that may be bulky, difficult to fold, and may not efficiently utilize space inside of the shipping container, thus increasing transportation costs, such as that disclosed in U.S. Pat. No. 9,284,088.

It would be desirable to provide improvements in insulating container liners in which the foregoing and other difficulties are reduced or eliminated.

SUMMARY

Disclosed are collapsible, insulating container liners and methods of forming the same. Example collapsible, insulating container liners may include a unitary body having at least one bottom panel, at least one top panel, and a plurality of side panels, wherein a portion of the panels are adjacent to each other, and a gap extending between adjacent panels, such that they may be folded relative to each other. Each of the at least one top panel, at least one bottom panel, and plurality of side panels has beveled edges around its outer perimeter, such that the beveled edges of one panel contact the beveled edge of an adjacent panel when folded to form an enclosed structure. In one example, each of the plurality of side panels is adjacent to the at least one bottom panel at no more than one side.

In one example, the unitary body is formed of a thermally insulating material, such as, expanded polystyrene. In another example, the unitary body has two opposing surfaces, at least one of which includes a layer formed of polymer film, metallic film, or a combination thereof. In one example, the polymer film is polyethylene and the metallic film is aluminum foil.

In yet another example, the unitary body of the collapsible, insulating container liner includes an inner lamination layer applied to one surface thereof, and an outer lamination layer applied to an opposing surface thereof. In one example, the inner lamination layer is formed of polymer film and the outer lamination layer is formed of metallic film. When folded, the inner lamination layer faces an interior of the enclosed structure and the outer lamination layer faces an exterior of the enclosed structure.

In one example, the enclosed structure is a box-shaped structure. In one example, the unitary body in an unfolded position has a generally cruciform shape.

In a further example, the beveled edge of one panel and the beveled edge of an adjacent panel form a groove at the gap. In one example, each of the grooves has a generally V-shape with a flat bottom portion that forms a gap having a width of about one sixteenth of an inch to about one eighth of an inch. In another example, the grooves extend all the way through the inner lamination layer and do not extend all the way through the outer lamination layer.

Also disclosed are insulating shipping containers which include a collapsible, insulating container liner placed inside of a shipping container. The collapsible, insulating container liner includes a unitary body having at least one bottom panel, at least one top panel, and a plurality of side panels, wherein a portion of the panels are adjacent to each other, and a gap extending between adjacent panels, such that they may be folded relative to each other. Each of the at least one top panel, at least one bottom panel, and plurality of side panels has beveled edges around its outer perimeter, such that the beveled edges of one panel contact the beveled edge of an adjacent panel when folded to form an enclosed structure.

Also disclosed are methods of forming a collapsible, insulating container liner. In one example, the method includes cutting bulk material to form a unitary body, cutting the unitary body to a predetermined shape, and making a plurality of beveled cuts through the thickness of the unitary body to form at least one top panel, at least one bottom panel, and a plurality of side panels. In one example, the step of cutting the bulk material to form a unitary body includes the steps of cutting the bulk material to a predetermined length, width and thickness. In yet another example, the method includes a further step of heat laminating two opposing surfaces of the unitary body to form an inner lamination layer and an outer lamination layer, before the step of cutting the unitary body to a predetermined shape. In one example, the predetermined shape of the uniform body is a generally cruciform shape. In yet another example, the plurality of beveled cuts are made through the inner lamination layer and the thickness of the unitary body and do not extend all the way through the outer lamination layer.

In one example, each of the cutting steps are performed by hot wire cutting. Under this method, the step of making the plurality of beveled cuts includes weighing down the unitary body on a table before cutting to hold it in place. The plurality of beveled cuts may be made simultaneously.

Additional details will be provided in the accompanying figures and the detailed description below.

DETAILED DESCRIPTION

Figure 1:
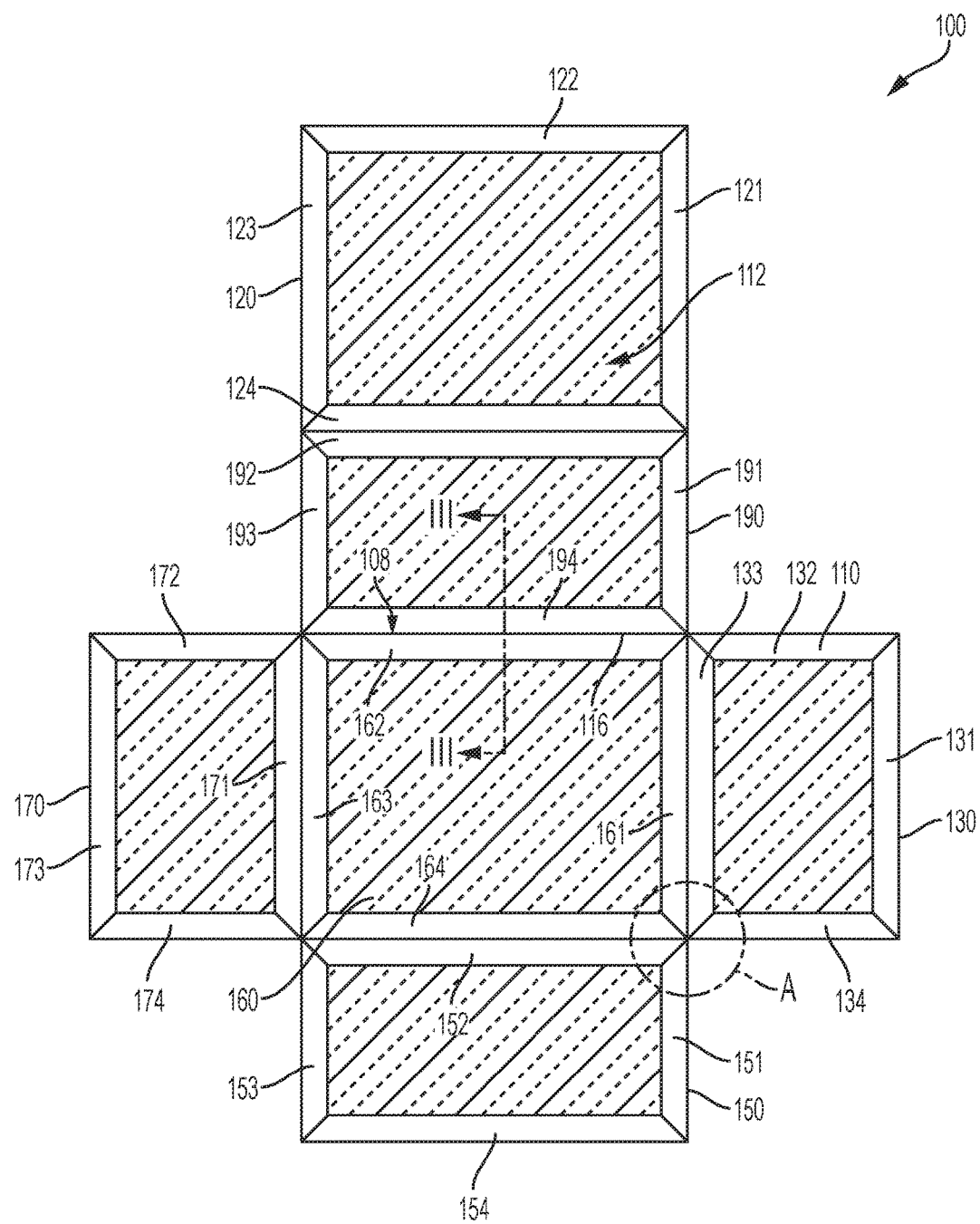
FIG. 1 is a view of the inside surface of an example collapsible insulating liner in the unfolded position in accordance with disclosed embodiments.
Figure 2:
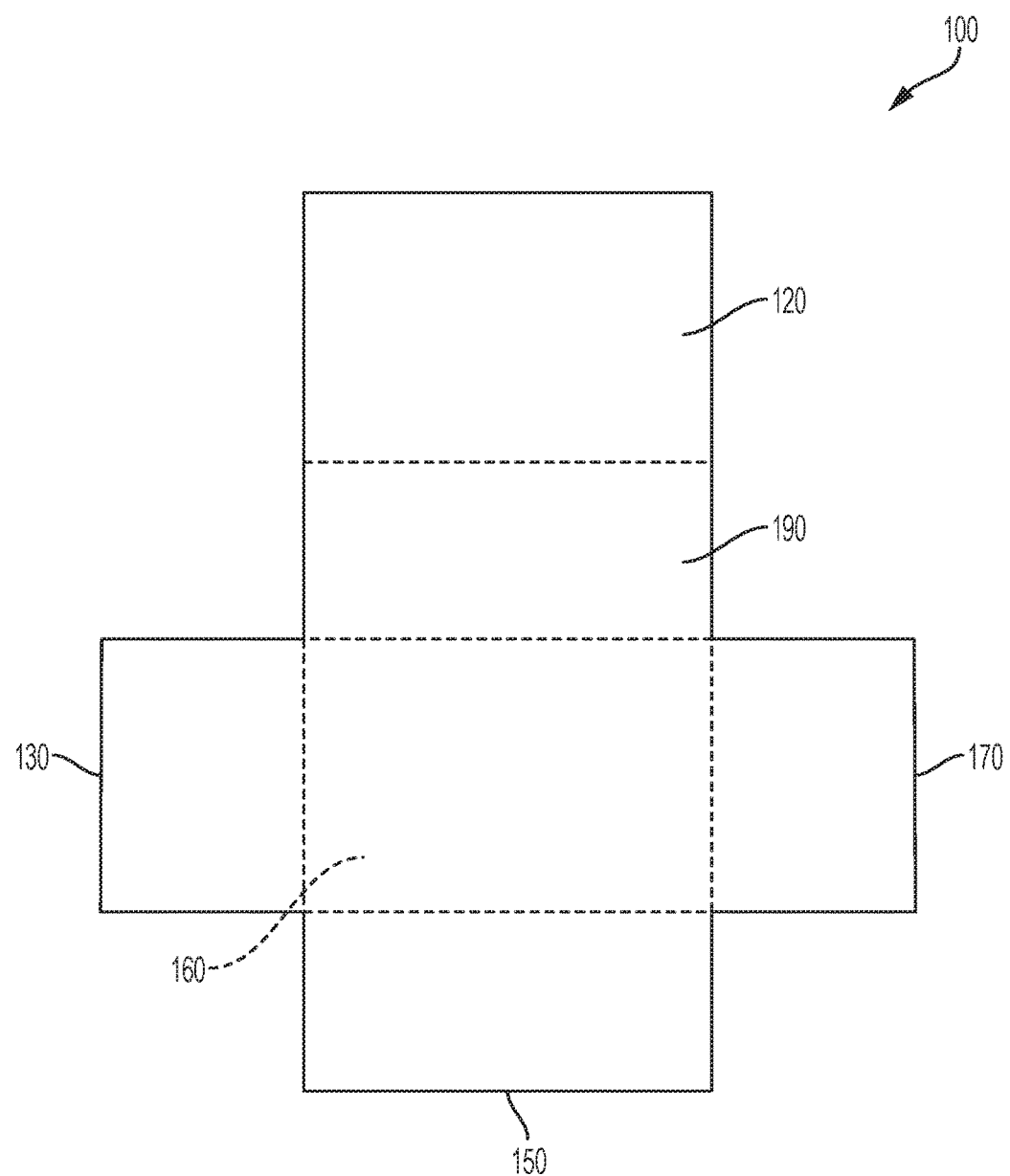
FIG. 2 is a view of the outside surface of the liner of FIG. 1.
Figure 3:
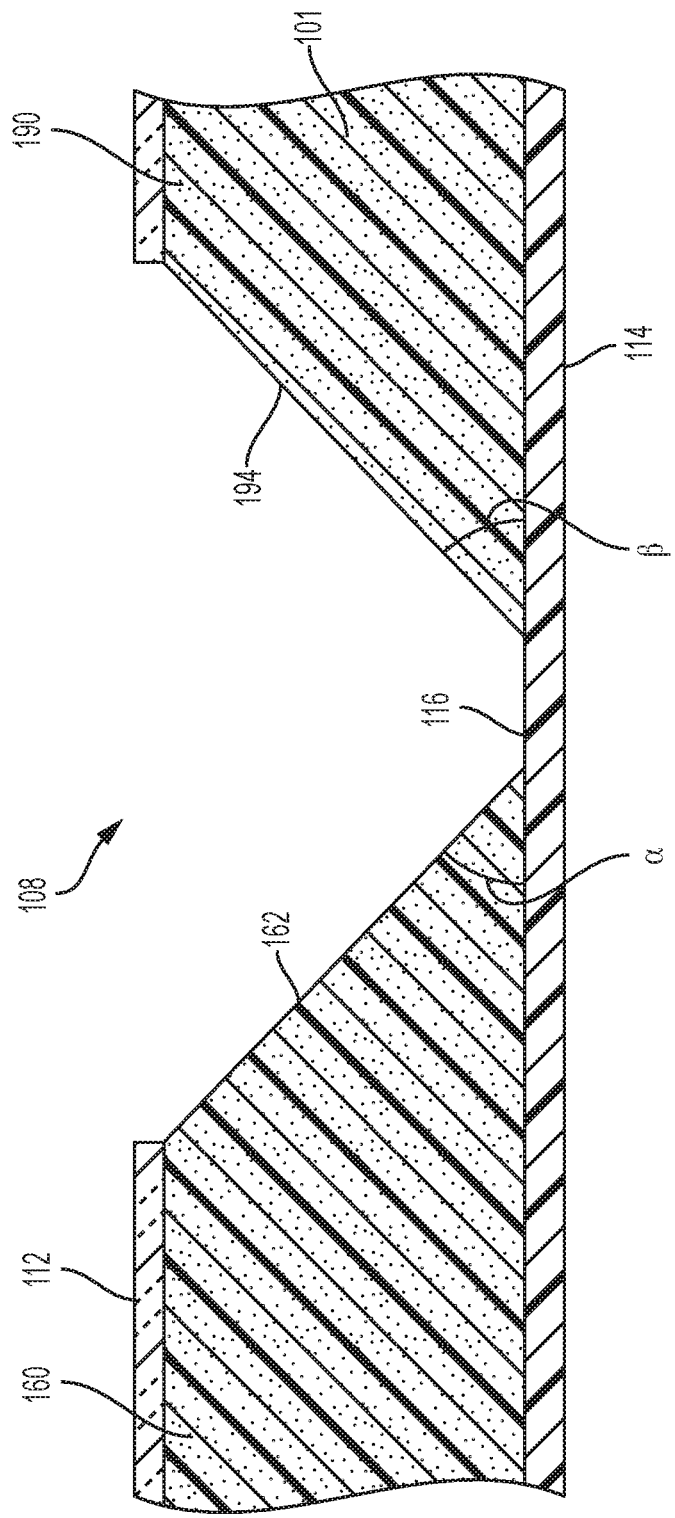
FIG. 3 is a partial cross section view taken along line of FIG. 1.

FIGS. 1-3 show various views of an example collapsible insulating liner (hereinafter, "liner") in its unfolded state. Liner 100 is generally formed as one, unitary body that has two opposing surfaces and is collapsible, such that it may be placed inside of a shipping container, such as, for example, a rectangular cardboard box. The body 101 (see FIG. 3) of the liner 100 is preferably made of a lightweight, thermally insulating material, such as, for example, polymer-based foams (e.g., expanded polystyrene (EPS), urethane foam), fiberglass, cellulose, and the like. Not only do these materials provide thermal insulation, but they can also provide cushioning to protect the goods from damage during shipping.

As illustrated in FIG. 1, the liner 100 is generally formed of six panels: a top panel 120, four side panels 130 (right side panel), 150 (front panel), 170 (left side panel), and 190 (back panel), and a bottom panel 160. When the liner 100 is unfolded, it has a generally cruciform shape, as illustrated in the bottom view of FIG. 2. Each of the side panels 130, 150, 170, 190 is positioned adjacent to no more than one side of the bottom panel 160. The top panel 120 is positioned adjacent to one of the back panels 190. In this way, when the liner 100 is folded, it will form a generally rectangular box-shaped structure. However, the liner 100 may be formed with any number of panels in any desired arrangement, such that any shape suitable for a particular application is achieved. For example, instead of having only one top panel 120, the liner 100 may be designed such that it has two top panels 120 that close inward toward each other when folded. Although the liner 100 may be used primarily with square or rectangular box containers, other liner arrangements may be used to fit other container arrangements. As another example, if the liner is to be used with a six-sided shipping container, the liner may have six side panels and the top and bottom panels will be hexagonal in shape. By way of further example, the liner could be formed as a triangular liner with three side panels and a triangular-shaped top and bottom panel.

Each of the panels has a beveled edge 110 along its outer perimeter. As illustrated in FIG. 1, top panel 120 includes beveled edges 121, 122, 123, and 124. The bottom panel 160 includes beveled edges 161, 162, 163, and 164. The right side panel 130 includes beveled edges 131, 132, 133, and 134. The left side panel 170 includes beveled edges 171, 172, 173, and 174. The front panel 150 includes beveled edges 151, 152, 153, and 154. Lastly, the back panel 190 includes beveled edges 191, 192, 193, and 194. Each of the beveled edges are preferably beveled at an angle of about 45 degrees, although other angles may be used to facilitate folding for a particular application. When folded, the beveled edge of one panel may come into contact with a beveled edge of an adjacent panel so as to enhance the thermal insulating properties of the resulting structure.

As illustrated in FIG. 1, where two panels are adjacent to each other, their adjacent beveled edges form a groove 108. In this way, a groove 108 separates each panel from its adjacent panel. For example, the beveled edge 194 of the back panel 190 is adjacent to the beveled edge 162 of the bottom panel 160, thus forming groove 108 that separates back panel 190 from bottom panel 160. A groove 108 separates each of right side panel 130, left side panel 170, front panel 150 and back panel 190 from bottom panel 160. A groove 108 also separates the top panel 120 from back panel 190. The grooves 108 preferably have a V-shape and function as the area where the liner 100 may be folded, although any shape of groove may be used that facilitates folding.

The liner 100 may include lamination layers on one or both of its top and bottom surfaces. Specifically, as illustrated in FIG. 3, the top surface of the liner 100 includes an inner lamination layer 112, and the bottom surface of the liner 100 includes an outer lamination layer 114. In one embodiment, both the inner lamination layer 112 and outer lamination layer 114 may be formed of a polymer or metallic film. In a preferred embodiment, the inner lamination layer 112 is formed of a polymer film, such as polyethylene, while the outer lamination layer 114 is formed of a metallic film, such as aluminum foil. In one embodiment, the inner lamination layer 112 functions to protect the underlying body 101 of the liner 100, so as to maintain the structural integrity of the body 101 and reduce potential damage to the body 101 caused by wear and tear. In another embodiment, the outer lamination layer 114 performs the same functions as the inner lamination layer 112, but additionally provides reflective and/or thermal insulation when it is formed of a metallic film. The outer lamination layer 114 is preferably formed of a deformable material, such that it can be folded to form the resulting liner structure.

As shown in FIG. 3, the groove 108 extends entirely through the inner lamination layer 112 and the body 101 of the liner 100, but does not extend through the outer lamination layer 114. This is because the outer lamination layer 114 functions to hold each of the individual panels together as one unitary body. When the groove 108 extends through the body 101, it separates the body 101 into its respective panels. Because the outer lamination layer 114 remains intact, and each of the resulting panels is physically secured to the outer lamination layer 114 (through heat lamination), a unitary liner structure is formed.

In an alternative example, the body 101 may be formed of a durable, deformable material, such as rubber. In this example, the liner has no inner lamination layer or outer lamination layer. Instead, the grooves 108 are cut into the body 101 to form areas of reduced thickness where folding will occur. The grooves 108 delineate each individual panel (e.g., top panel, bottom panel, and side panels). Thus, the liner is formed as one continuous and unitary body.

Figure 4:
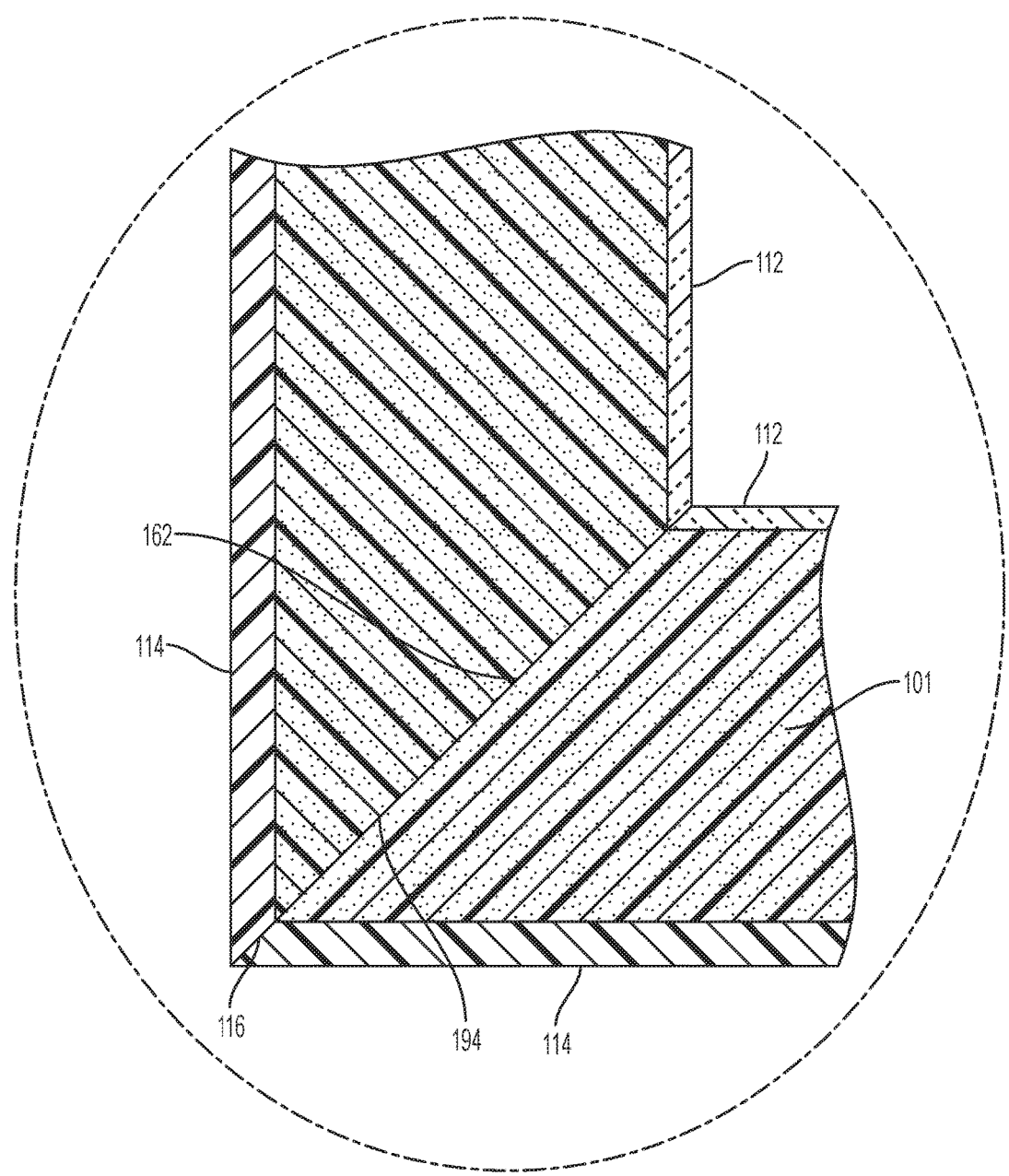
FIG. 4 is a partial cross section view taken along line of FIG. 1 in the folded position.
Figure 5:
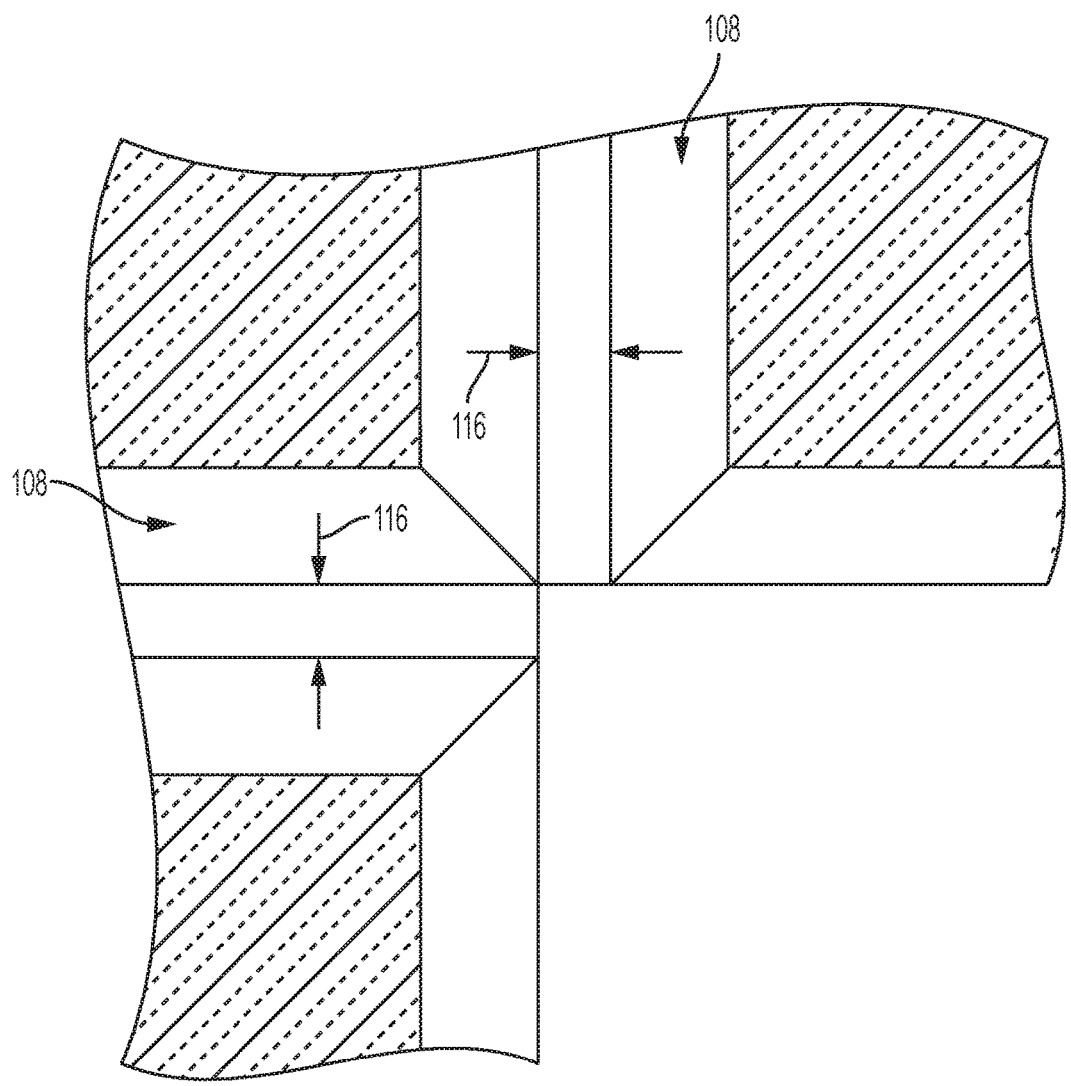
FIG. 5 is an enlarged view of the area A of FIG. 1.

In one embodiment, each of the grooves 108 has a V-shape with a flat portion at the bottom of the "V" forming a gap 116, as illustrated in FIGS. 3-5. The gap 116 allows adjacent panels, such as a side panel 130, 150, 170, 190 and bottom panel 160, to be folded relative to one another. In the illustrated example, the groove 108 between bottom panel 160 and back panel 190 is shown. The beveled edge 162 of the bottom panel 160 and the beveled edge 194 of the back panel form each side of the groove 108, which may be cut at an angle α and angle β that is equal to 45 degrees relative to the bottom surface of the body 101. In another example, depending on the desired shape of the resulting folded structure, angle α and angle β may be any angles that together add to 90 degrees. In other examples, the grooves may have any other shape, such as U-shaped, that facilitates folding of panels relative to one another.

In FIG. 4, two adjacent panels have been folded relative to one another in the area of the gap 116, such that the adjacent beveled edges of the panels that form the groove 108 come into contact with one another. FIG. 5 illustrates the gap 116 in one of the V-shaped grooves 108. In one embodiment, the gap 116 may be about one sixteenth of an inch to about one eighth of an inch in width, to allow for sufficient folding. However, any gap width suitable for a particular application may be utilized. Because the groove 108 does not extend into the outer lamination layer 114, which remains fully intact, the panels are held together as one unitary body and are capable of being folded without becoming detached from one another.

Figure 6:
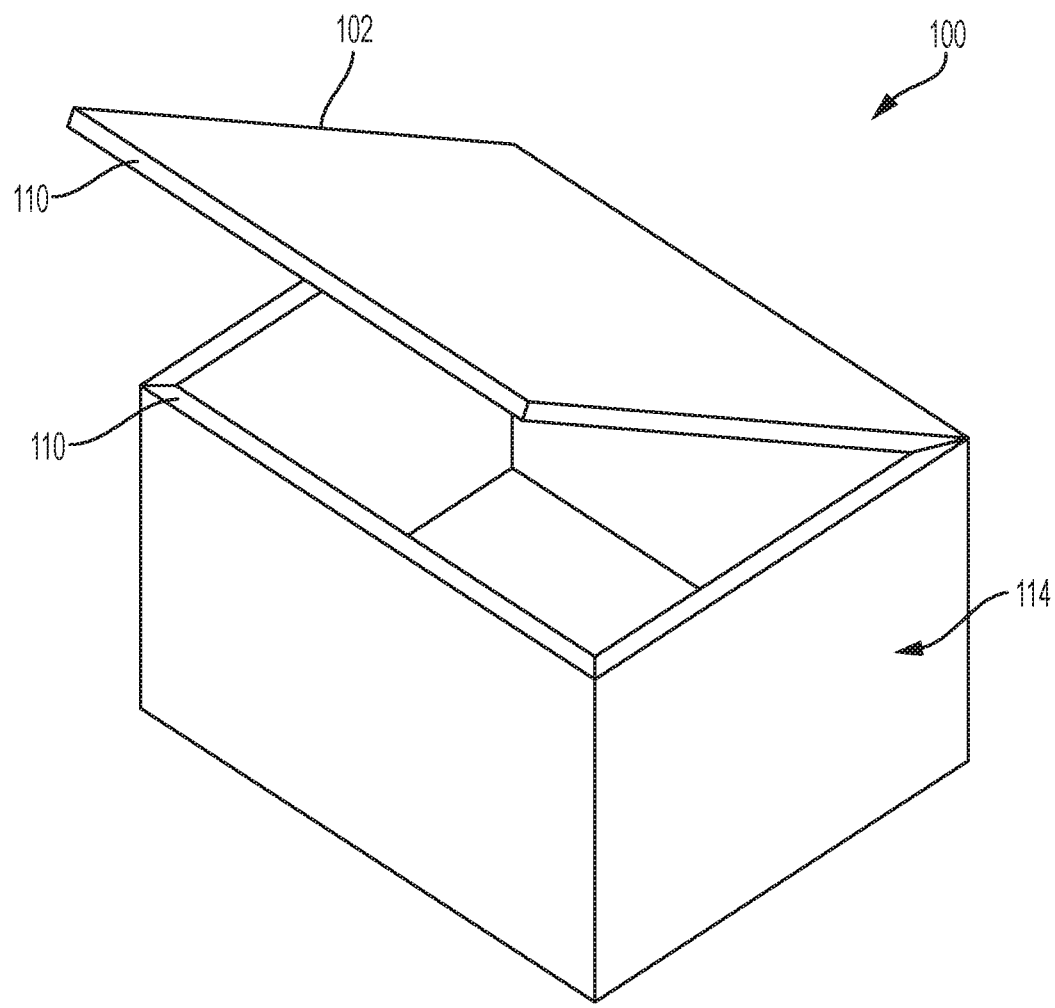
FIG. 6 is a perspective view of an example collapsible insulating liner in a folded position in accordance with disclosed embodiments.

The folded liner 100 is illustrated in FIG. 6. The right side panel 130 and left side panel 170, and the front panel 150 and back panel 190 form the sides of the resulting box-shaped structure, and the top panel 120 forms the lid that allows access to whatever is being stored inside of the liner 100. Although not shown, the bottom panel 160 forms the bottom of the box. When folded, the inner lamination layer 112 faces the inside of the box, while outer lamination layer 114 faces the exterior of the box. The beveled edges 110 allow the edge of each panel to contact the other when folded, so as to form an enclosed box that will store and protect perishable items.

Figure 7:
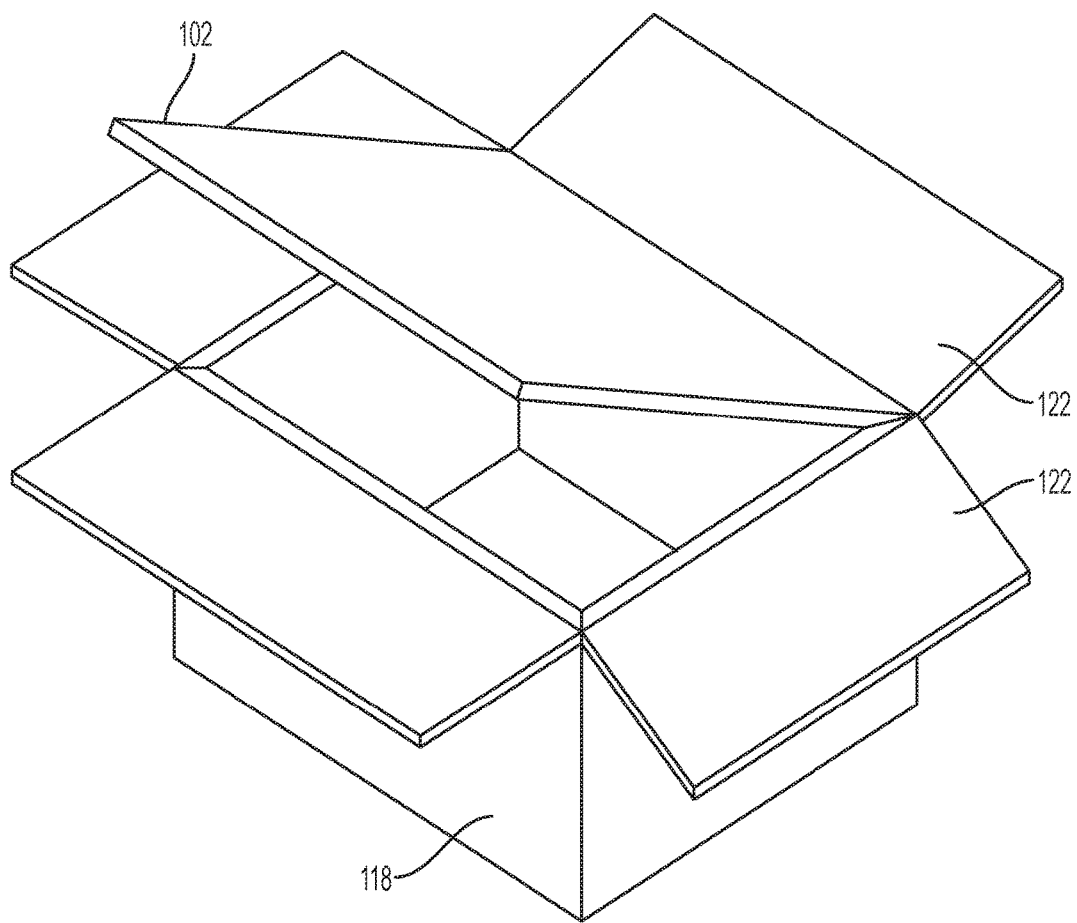
FIG. 7 is a perspective view of the example collapsible insulating liner of FIG. 5 positioned inside of a shipping container in accordance with disclosed embodiments.
Figure 8:
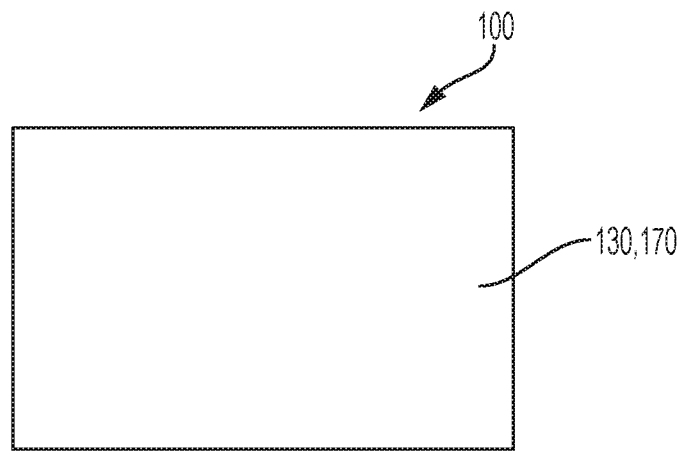
FIG. 8 is a left or right side view of the example collapsible insulating liner of FIG. 5 in accordance with disclosed embodiments.
Figure 9:
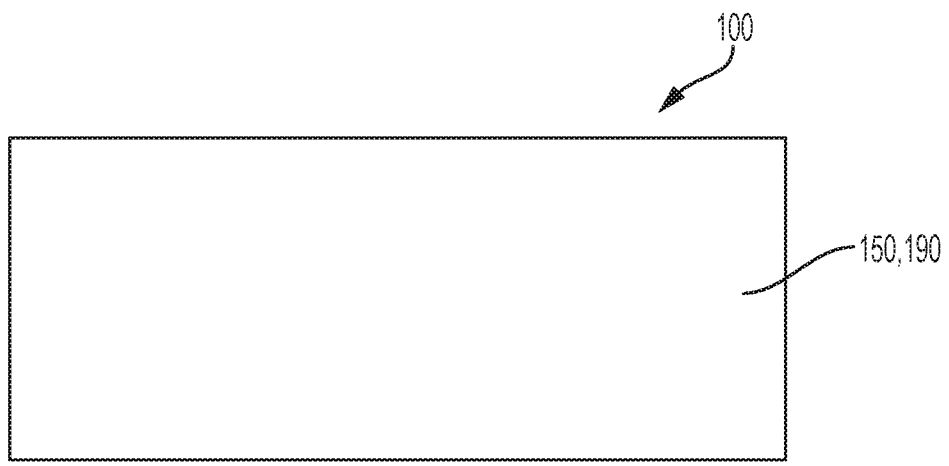
FIG. 9 is a front or back side view of the example collapsible insulating liner of FIG. 5 in accordance with disclosed embodiments.
Figure 10:
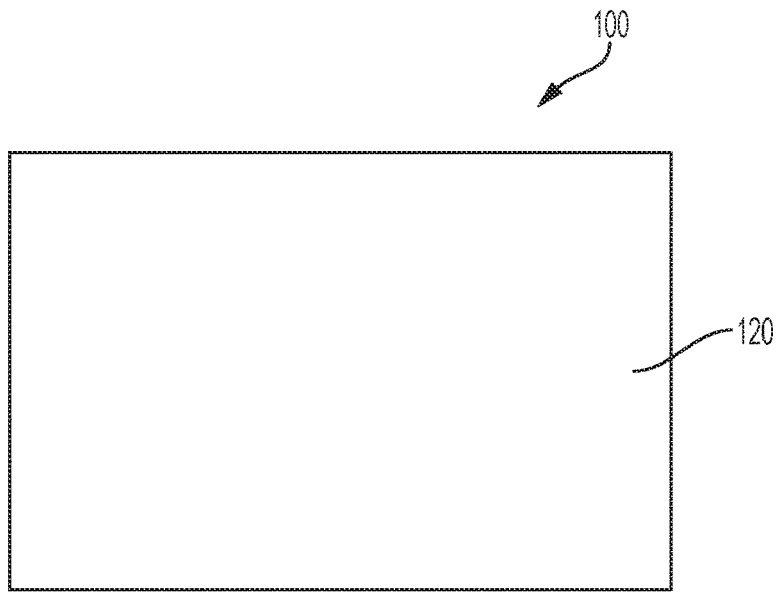
FIG. 10 is a top view of the example collapsible insulating liner of FIG. 5 in accordance with disclosed embodiments.
Figure 11:
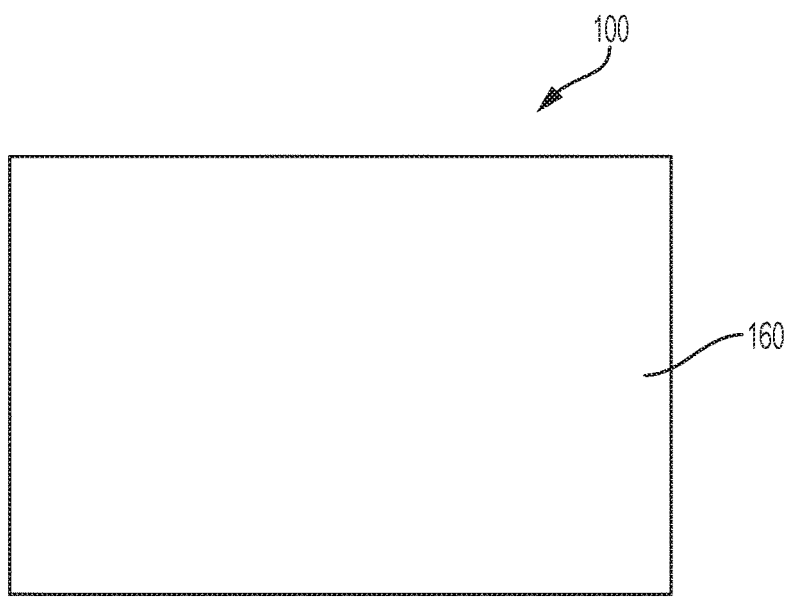
FIG. 11 is a bottom view of the example collapsible insulating liner of FIG. 5 in accordance with disclosed embodiments.

As shown in FIG. 7, the folded liner 100 may then be placed inside of a shipping container, such as a shipping box 118. In one embodiment, the shipping box 118 may be a corrugated plastic or cardboard box, although the liner 100 may be used with any known containers suitable for shipment of goods. In one example, the liner 100 is designed such that, when folded, it fits snugly inside of the shipping box 118 to avoid movement of the liner during transport. Once the top lip panel 120 is fully folded so as to enclose the liner 100, the closure panels 122 of the shipping box 118 may then be folded and secured with tape, staples, or the like so as to enclose the entire package.

The sides, top and bottom views of the folded liner 100 are illustrated in FIGS. 8-11.

A method of manufacture of the collapsible container liner is also provided. In a first step, a piece of bulk material that is to be used to form the liner 100, such as expanded polystyrene, is cut to its desired length, width and thickness for the particular application to form the unitary body 101. In one embodiment, the material may be cut to length using a guillotine machine, such as the Model # Drew Foam 0010 machine, manufactured by Drew Foam of Monticello, Ark. 71655. The material is also cut to thickness using a slicing machine, such as the Gateway Autowire Model # GP 11000 machine, manufactured by Gateway Precision Technologies Company/A Hunker Technologies Company of Covington, Ky. 41011. Lastly, the material is cut to width using a down cutter machine, such as the Gateway Up/down Cutter Model # GP 2103 machine, manufactured by MFG.—Gateway Precision Technologies Company/A Hunker Technologies Company of Covington, Ky. 41011. However, any methods known in the art for cutting and/or slicing the specific materials may be used. In a preferred embodiment, when first formed, the body 101 of the liner 100 has a generally consistent thickness along its entire length and width. In one embodiment, the body 101 may be cut to its desired length, width, and thickness using the equipment identified above.

In a second step, once the liner 100 is cut to the desired dimensions, the body 101 is heat laminated on one or both sides. In one embodiment, where the body 101 of the liner 100 is formed of EPS, it may be laminated on one or both sides with a polymer film or a metallic film. In a preferred embodiment, one side of the body 101 of the liner 100 is laminated with polymer film, such as polyethylene, to form the inner lamination layer 112. The opposing side of the body 101 of the liner 100 is laminated with a metallic film, such as aluminum foil, to form the outer lamination layer 114. In one example, the lamination is performed using a Heated Rotary Laminator Model # Series 55-56" machine, manufactured by Union Tool Corp. of Warsaw, Ind. 46580.

In the next step, the liner 100 is then cut to the predetermined overall shape using a die cutting machine, such as a Die press/Bean press Model # AL 81 machine, manufactured by Atom SpA of Via Morosini, 6 Vigevano, Pavia 27029 Italy, and distributed by RELCO, Inc. of Toronto, Ontario, Canada. In this example, a die having the shape of the desired overall liner is used. While liner 100 is shown in FIG. 1 as having a generally cruciform shape, the liner may have any shape that is suitable for use with a particular shipping container.

Lastly, the liner 100 is transferred to a fixture that cuts the plurality of beveled edges 110 in the liner 100 using a hot wire cutting technique. In one example, the hot wire cutting is performing using a Hot Wire cutter Model—GP-5100 machine, manufactured by Gateway Precision Technologies Company/A Ritec Company of Holland, Mich. 49424. To achieve cut precision, the liner 100 is preferably clamped down to the cutting table or is otherwise held down by weights to keep it in place. The speed of the cutting, temperature of the hot wire, and even humidity in the environment should be carefully monitored to ensure a precise cut. The hot wires are positioned according to the desired placement of the cuts to be made and the placement of the liner 100 on the cutting fixtures. In one embodiment, this step may be facilitated using a computer with customized software that operates the hot wire cutting apparatus. Each of the plurality of beveled edges 110 may be cut simultaneously, or the cuts may be done in sequence depending on the particular application.

Any number of beveled edges 110 may be cut into the liner 100 depending on the size and shape of the shipping container into which the liner 100 will be placed and the number of desired grooves 108 for folding. When forming the beveled edges 110, the cuts are made only through the inner lamination layer 112 (if present) and the thickness of the body 101 of the liner 100 itself. The outer lamination layer 114 (if present) remains intact so as to secure all of the resulting panels together when folded. By way of example, the liner 100 illustrated in FIG. 1 includes two vertical V-shaped grooves and three horizontal V-shaped grooves, so as to form a generally rectangular shape when folded. Beveled edge cuts 110 are made along the outer perimeter of each of the panels of the liner 100 to facilitate folding. These beveled edge cuts 110 may be cut by hot wire cutting simultaneously with the cutting of the grooves 108, or they may be cut before or after the grooves 108.

In this manner, a new and unique collapsible and foldable container liner is presented that provides an improvement in insulation for shipment of perishable goods, while simplifying the structure and reducing assembly steps.

It should be understood that the above description is only illustrative of the invention. Various alternatives and modi-

What is claimed as new and desired to be protected by Letters Patent of the United States is:

1. A collapsible, insulating container liner, comprising:
   a unitary body having at least one top panel, at least one bottom panel, a plurality of side panels, and two opposing surfaces,
   wherein a portion of the panels are adjacent to each other, and
   wherein an inner lamination layer formed of a polymer film is applied to one of said opposing surfaces of the unitary body, and an outer lamination layer formed of a metallic film is applied to the other of said opposing surfaces of the unitary body; and
   a gap extending between adjacent panels, such that they may be folded relative to each other,
   wherein each of the at least one top panel, at least one bottom panel, and plurality of side panels has beveled edges around its outer perimeter, such that the beveled edge of one panel contacts the beveled edge of an adjacent panel when folded to form an enclosed structure, and
   wherein the beveled edge of one panel and the beveled edge of an adjacent panel from a groove at the gap open at the inner lamination layer,
   wherein the inner lamination layer does not extend onto the beveled edges, and
   wherein the groove is cut through the inner lamination layer and does not extend through the outer lamination layer.

2. The collapsible, insulating container liner of claim 1, wherein the unitary body is formed of a thermally insulating material.

3. The collapsible, insulating container liner of claim 2, wherein the unitary body is formed of expanded polystyrene.

4. The collapsible, insulating container liner of claim 1, wherein the polymer film is polyethylene.

5. The collapsible, insulating container liner of claim 1, wherein the metallic film is aluminum foil.

6. The collapsible, insulating container liner of claim 1, wherein the groove is a V-shaped groove.

7. The collapsible, insulating container liner of claim 1, wherein, when folded, the inner lamination layer faces an interior of the enclosed structure and the outer lamination layer faces an exterior of the enclosed structure.

8. The collapsible, insulating container liner of claim 1, wherein the enclosed structure is a box-shaped structure.

9. The collapsible, insulating container liner of claim 1, wherein the unitary body has a generally cruciform shape.

10. The collapsible, insulating container liner of claim 1, wherein the gap has a width of about one sixteenth of an inch to about one eighth of an inch.

11. The collapsible, insulating container liner of claim 1, wherein each of the plurality of side panels is adjacent to the at least one bottom panel at no more than one side.

12. An insulating shipping container, comprising:
    a collapsible, insulating container liner, including,
       a unitary body having at least one top panel, at least one bottom panel, a plurality of side panels, wherein a portion of the panels are adjacent to each other, and two opposing surfaces, wherein an inner lamination layer formed of a polymer film is applied to one of said opposing surfaces of the unitary body, and an outer lamination layer formed of a metallic film is applied to the other of said opposing surfaces of the unitary body; and
       a gap extending between adjacent panels, such that they may be folded relative to each other,
       wherein each of the at least one top panel, at least one bottom panel, and plurality of side panels have beveled edges around their outer perimeter, such that the beveled edge of one panel contacts the beveled edge of an adjacent panel when folded to form an enclosed structure,
       wherein the beveled edge of one panel and the beveled edge of an adjacent panel form a groove at the gap open at the inner lamination layer, wherein the inner lamination layer does not extend onto the beveled edges, and
       wherein the groove is cut through the inner lamination layer and does not extend through the outer lamination layer; and a shipping container,
    wherein the collapsible, insulating container liner is placed inside of the shipping container.

13. A method of forming a collapsible, insulating container liner, comprising the steps of:
    cutting bulk material to form a unitary body;
    heat laminating two opposing surfaces of the unitary body to form an inner lamination layer and an outer lamination layer, before cutting the unitary body to a predetermined shape;
    cutting the unitary body to a predetermined shape; and
    making a plurality of beveled cuts through the inner lamination layer and through a thickness of the unitary body to form at least one top panel, at least one bottom panel, and a plurality of side panels,
       wherein the inner lamination layer is formed of a polymer film, and the outer lamination layer is formed of a metallic film, and
       wherein the plurality of beveled cuts are made through the inner lamination layer, such that the inner lamination layer does not extend onto the beveled edges, and the thickness of the unitary body and do not extend through the outer lamination layer.

14. The method of claim 13, wherein the step of cutting the bulk material to form a unitary body includes the steps of cutting the bulk material to a predetermined length, width and thickness.

15. The method of claim 13, wherein the predetermined shape is a generally cruciform shape.

16. The method of claim 13, wherein each of the cutting steps are performed by hot wire cutting.

17. The method of claim 13, wherein the step of making the plurality of beveled cuts includes weighing down the unitary body on a table before cutting.

18. The method of claim 13, wherein each of the plurality of beveled cuts are made simultaneously.

* * * * *